United States Patent [19]
Conti et al.

[11] Patent Number: 5,481,569
[45] Date of Patent: Jan. 2, 1996

[54] OPTIMIZING THE ANALOG BIT FUNCTION IN A DIVERSITY RADIO RECEIVER BY VARYING THE RELATIVE ATTENUATION LEVEL BETWEEN TWO CHANNELS AFTER OPTIMIZING THE RELATIVE PHASE BETWEEN THE TWO CHANNELS

[75] Inventors: Adelio Conti, Montevecchia; Rocco Nobili, Cassina del Pecchi; Paolo Troyer, Sesto S. Giovanni, all of Italy

[73] Assignee: Alcatel Italia S.p.A., Milan, Italy

[21] Appl. No.: 66,386

[22] Filed: May 21, 1993

[30] Foreign Application Priority Data

May 25, 1992 [IT] Italy ................ MI92A01270

[51] Int. Cl.⁶ ............... H04B 7/10; H04L 1/02
[52] U.S. Cl. .......... 375/347; 455/138; 455/139
[58] Field of Search ...................... 455/132, 133, 455/134–139, 277.2; 375/347, 267

[56] References Cited

U.S. PATENT DOCUMENTS 4,972,434  11/1990  Polozec et al. ............ 375/14

FOREIGN PATENT DOCUMENTS 0477158   3/1992  European Pat. Off. .
1227559   4/1991  Italy .
57-129044  8/1982  Japan .
57-147350  9/1982  Japan .

OTHER PUBLICATIONS

Yeh et al, "A new approach to space diversity combining in microwave digital radio", *AT&T Tech J*, v 64 No. 4, Apr. 1985, pp. 885–905.

Casiraghi et al., "MiBS IF combiner for space and angle diversity in digital radio: First trial results", *Proc 22nd European Microwave Conf*, Aug. 1992, pp. 1143–1148.

*Primary Examiner*—Stephen Chin
*Assistant Examiner*—Hai H. Phan
*Attorney, Agent, or Firm*—Robbins, Berliner & Carson

[57] ABSTRACT

A radio link for a digital radio transmission system having spatial and/or angular diversity is optimized in real time by first varying the relative phase φ between the two channels to locate an absolute minimum of the analog bit error rate function $BER_n(\phi)$ with both channels having the same nominal attenuation level, and then by unbalancing the relative attenuation level T of the two channels in order to optimize the dispersion $Ban_n(T)$ of the recombined data spectrum while holding the relative phase at its previously optimized value.

2 Claims, 12 Drawing Sheets

OPTIMIZING THE ANALOG BIT FUNCTION IN A DIVERSITY RADIO RECEIVER BY VARYING THE RELATIVE ATTENUATION LEVEL BETWEEN TWO CHANNELS AFTER OPTIMIZING THE RELATIVE PHASE BETWEEN THE TWO CHANNELS

FIELD OF THE INVENTION

The present invention relates to a spatial and/or angular diversity digital radio transmission system, and more particularly to optimizing the combining of the input signals in such a system under varying transmission conditions.

BACKGROUND ART

Figure 1:
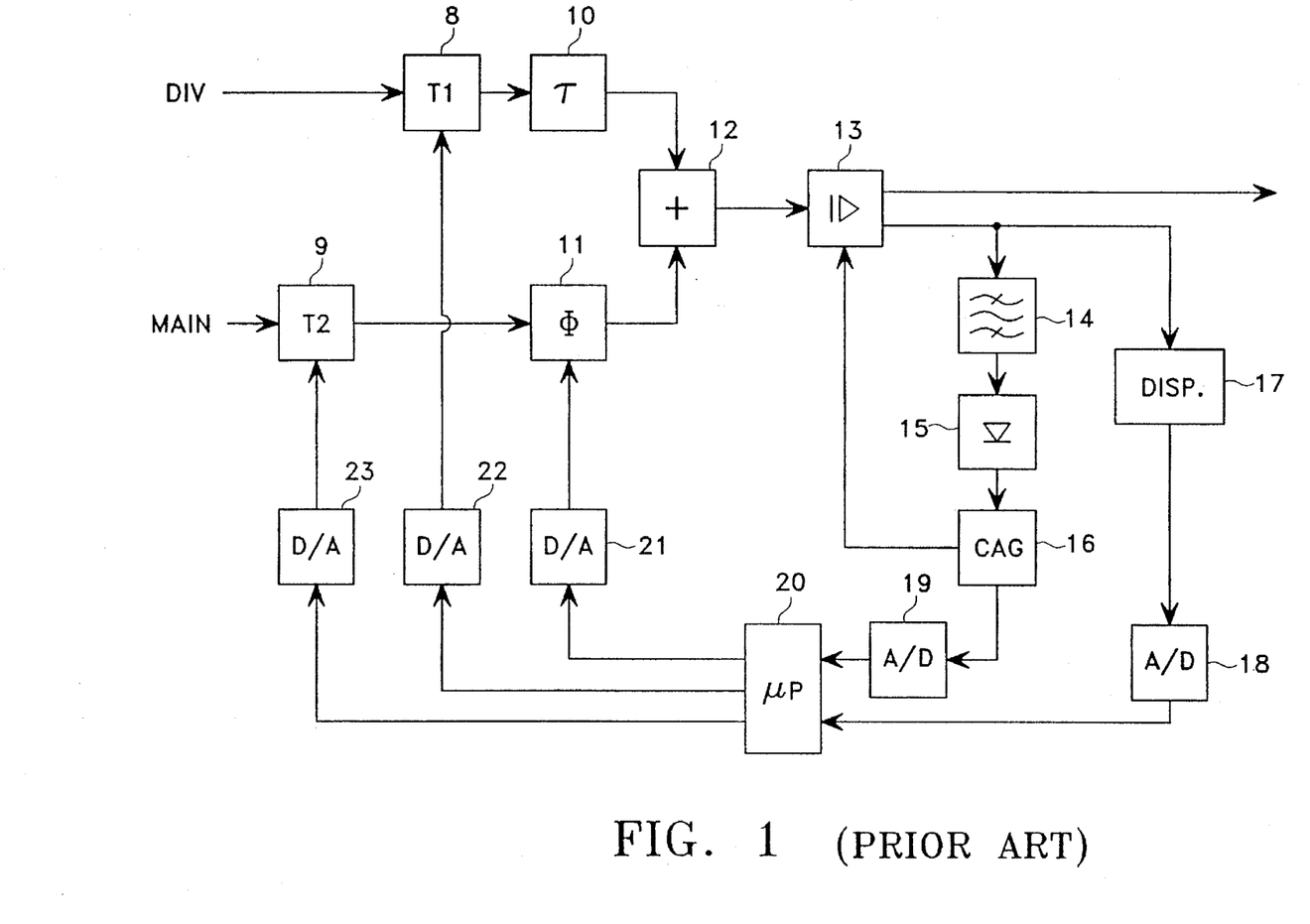
FIG. 1 is a generalized schematic of a prior art combining system and corresponds to FIG. 6 of Italian Patent 1,227,559.

In commonly assigned published Italian Patent No 1,227,559, there is described a system for combining at least two signals which are received at different locations in space (spatial diversity reception) and/or at different angular orientations (angular diversity reception); FIG. 1 of that publication is a generalized schematic of such a diversity combining system. In the known diversity receiver, an intermediate-frequency estimated BER (bit err rate) function is monitored in order to provide a minimum-BER combiner.

The intermediate frequency estimated BER function is called "analog BER" and is given by the formula:

$$BER = 10^{\alpha P + \beta} + 10^{\gamma D + \delta} \quad (1)$$

In this formula the variables P and D correspond to the power and dispersion of the combined signal, while the coefficients $\alpha$, $\beta$, $\gamma$, $\delta$ depend on the type of modulator-demodulator employed.

It is possible to re-express equation (1) in the form:

$$BER = A \cdot Rag(P) + B \cdot Ban(D) \quad (2)$$

where:
Rag $(P) = 10^{\alpha P}$
Ban$(D) = 10^{\gamma D}$
$A = 10^{\beta}$
$B = 10^{\delta}$ in which the function Rag(P) represents the power of the recombined data spectrum, and the function Ban(D) represents the dispersion of said spectrum.

Since power and dispersion depend on the recombination phase $\phi$ and the attenuation T1, T2 introduced on each of the two channels by respective attenuators, the analog BER function for any particular combination of input signals on the two channels can also be expressed as:

BER($\phi$,T1,T2)

it being understood that the analog BER function is also dependent on the characteristics of the two input signals being applied to the combiner.

The channel that both phase-shifts and attenuates the signal upstream of the summing node may be designated MAIN and the channel that only attenuates upstream of the node may be designated DIV, as shown in FIG. 6 of the above cited Italian Patent 1,227,559 herein reproduced as FIG. 1. In this FIG the references indicate respectively:

MAIN: channel that phase-shifts and attenuates the signal upstream of the summing node.
DIV : channel that attenuates upstream of the summing node.
8: driven attenuator T1
9: driven attenuator T2
10: delay line
11: driven phase shift
12: summing node
13: IF amplifier
14: power detection filter
15: detector
16: automatic gain control
17: dispersion measurement network
18: A/D converter
19: A/D converter
20: microprocessor
21: D/A converter
22: D/A converter
23: D/A converter Assuming a dispersion on the MAIN channel characterized by an echo delay $\tau$, a notch depth $B_{cm}$ and a notch frequency position $F_{nm}$, and also assuming a dispersion on the DIV channel characterized by an echo delay $\tau$, a notch depth $B_{cd}$ and notch frequency position $F_{nd}$, these parameters will define the selective fading present on the MAIN and on the DIV channels, resulting in a first analog BER function $BER_1(\phi,T1,T2)$.

As the parameters determining the selective fading present on the two input channels change, one will obtain other analog BER functions $BER_n(\phi,T1,T2)$ different from $BER_1(\phi,T1,T2)$. Therefore it will be possible to define countless $BER_n(\phi,T1,T2)$'s corresponding to the countless possible selective fading conditions.

Setting T1 and T2 equal to the same nominal attenuation value ($T1_n$ indicates a nominal value of T1 and $T2_n$ indicates a nominal value of T2) results in the function:

$$BER_n(\phi) = A \cdot Rag_n(\phi) + B \cdot Ban_n(\phi) \quad (3)$$

For optimizing $BER_n(\phi)$, varying $\phi$ in accordance with a conventional gradient search technique is usually sufficient to locate the desired minimum, assuming that the $BER_n(\phi)$ function was reasonably smooth. However, a $BER_n(\phi)$ which remains constant over a relatively large phase interval is not necessarily suitable for determining the optimum phase for combining the two input signals. Moreover, in general the $BER_n(\phi)$ function will not have only one minimum but will have both a relative minimum $M_{rel}$ and an absolute minimum $M_{ass}$ (FIG. 3A); there are $BER_n(\phi)$'s that have a relative minimum corresponding to an "out of order" radio link, and an absolute minimum for which the link performs satisfactorily.

It should also be noted that when one tries to minimize dispersion through phase shifting, there is the risk of drastically lowering the power.

Moreover, where the recombined data spectrum presents a linear dispersion resulting from different flat attenuation or even in which the flat attenuation level of the two signals is equal, there are cases where the optimum phase for $BER_n(\phi)$ does not result in minimize dispersion.

Different propagation features characteristic of the two channels, or a temporary mispointing of the antennas (in a spatial diversity system) can cause a level difference between the two channels which in turn may result in a degraded tolerance of the combiner to selective fading.

DISCLOSURE OF INVENTION

It is an overall object of the present invention to provide an improved method of processing and optimizing the analog BER (bit error rate) function in the receiver of a spatial and/or angular diversity digital radio transmission system having two or more inputs, to thereby provide an optimum combining of the inputs.

In particular, in accordance with the present invention, the analog BER function is optimized not only by varying the phase between the MAIN channel and the DIV channel, but also by varying the attenuation values introduced on the two channels of attenuators T1 and T2.

In a preferred embodiment, the phase is first optimized, and then the dispersion is used to determine an optimum attenuation.

DETAILED DESCRIPTION OF A PREFERRED EMBODIMENT

Let $BERk_n(\phi)$ be an alternate BER estimating function that is obtained by a different weighting of the dispersion and power components of equation (3); such an alternate function gives higher weight to dispersion or to power as the values of multiplicative coefficients A and B are varied.

It is necessary to decide in what cases, with $BER_n(\phi)$ (curve I° in FIGS. 2 & 3) being constant, the function to be optimized will be $BER1_n(\phi)$ in which the dispersion function $Ban_n(\phi)$ will have a weight greater than the power function $Rag_n(\phi)$, and in what cases it will be $BER2_n(\phi)$ in which $Rag_n(\phi)$ has a weight greater than $Ban_n(\phi)$.

Figure 2:
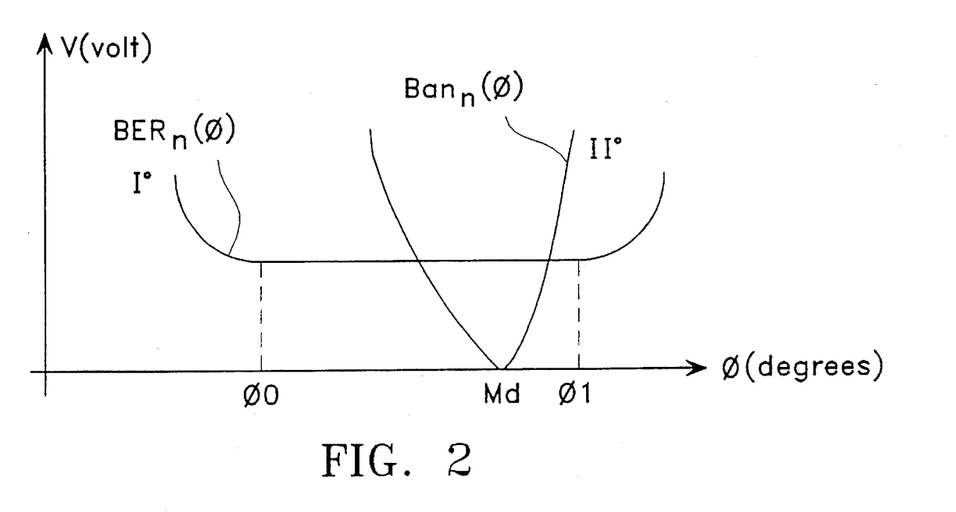
FIG. 2 shows a $BER_n(\phi)$ where the dispersion minimum Md is well defined while the $BER_n(\phi)$ is almost constant.

In cases where the function to be optimized is $BER1_n(\phi)$, the situation will be similar to the one shown in FIG. 2 in which the dispersion minimum Md of the function $Ban_n(\phi)$ (curve II°) is well defined, and the function is no longer at its minimum after only a slight variation of $\phi$ (eg, only a few degrees), while $BER_n(\phi)$ (curve I°) remains almost constant over a much larger range of $\phi$ (eg, some tens of degrees).

In order to identify such a situation with certainty it is necessary that at least the following conditions occur:

1. Movement of the phase shift several degrees in the same direction (i.e. shifting the phase n1 times in the same direction) will result in the dispersion $Ban_n(\phi)$ being subjected to a substantial variation, while $BER_n(\phi)$ does not vary much (let Difb be this minimum variation of $BER_n(\phi)$).

2. The dispersion of the recombined data spectrum will increase once the optimum dispersion has been arrived at, even though $BER_n(\phi)$ remains nearly constant; in practice referring to FIG. 2 one must have passed through the minimum dispersion point (Md) before the function $BER1_n(\phi)$ can be considered optimized.

Figure 3:
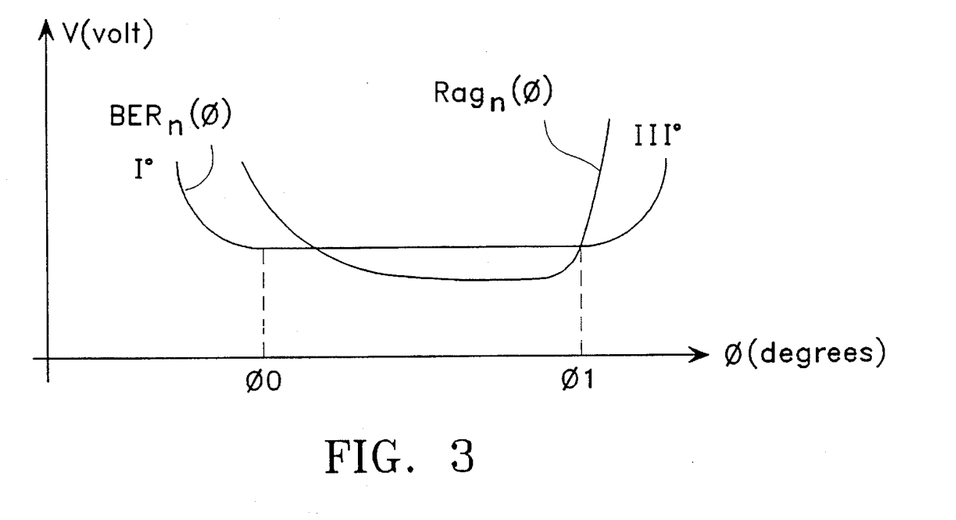
FIG. 3 shows a $BER_n(\phi)$ for which the power has a weight higher than dispersion and in which before observing a variation of the power it is necessary to vary the phase by several degrees.
Figure 3A:
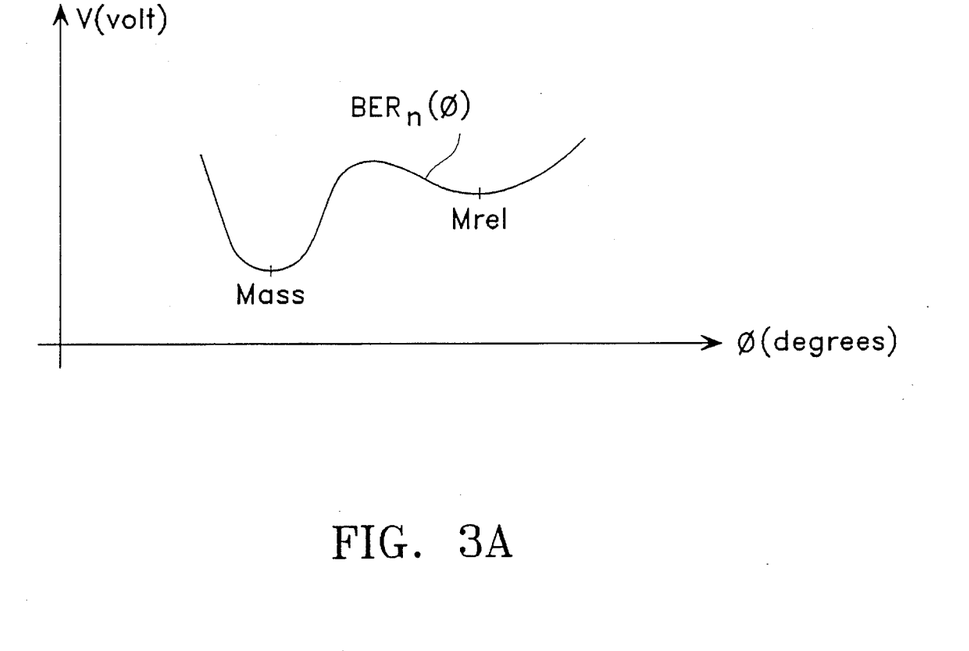
FIG. 3A shows a $BER_n(\phi)$ which has both a relative minimum and an absolute minimum.

In cases when the function to be optimized is a $BER2_n(\phi)$ in which the power $Rag_n(\phi)$ has a weight higher than $Ban_n(\phi)$ there will be a situation like that of FIG. 3, in which it can be seen that before observing a substantial variation of the power $Rag_n(\phi)$ (curve III°) in the region where $BER_n(\phi)$ remains nearly constant (let Difr be this minimum variation of $BER_n(\phi)$) it is necessary to vary $\phi$ by several degrees (i.e. shifting the phase n2 times in the same direction, n1<<n2). Moreover in this case one does not pass through a zero dispersion point, so that although both the power and the dispersion will vary in response to variations in $\phi$, the dispersion will remain at a relatively high value.

In both cases, as soon as $BER_n(\phi)$ begins varying again as $\phi$ varies, e.g. because the notches present on the two channels have moved away in frequency, the function to be optimized should again be the original $BER_n(\phi)$ function.

Figure 4:
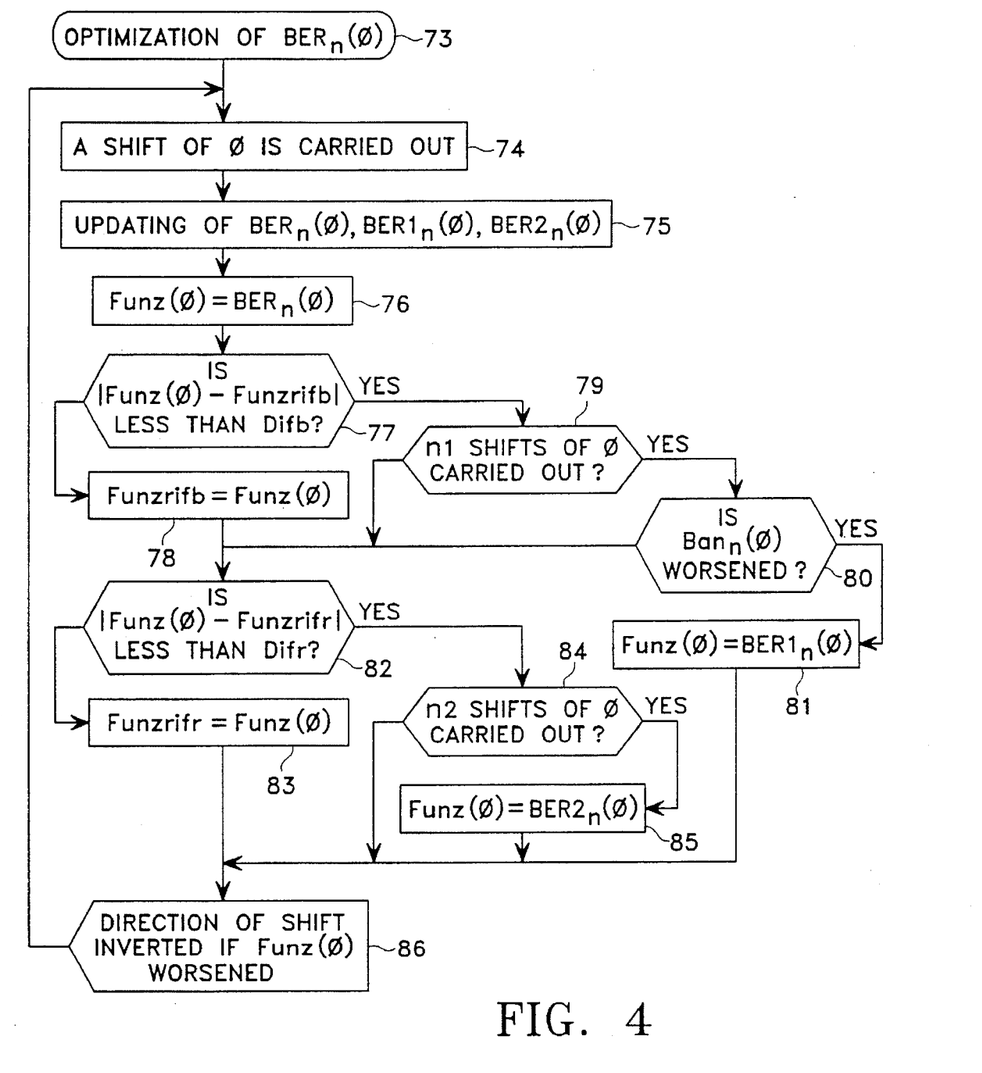
FIG. 4 is a block diagram of an optimization function that in most cases will be equal to $BER_n(\phi)$ but that in some instances will be equal to $BER1_n(\phi)$ or to $BER2_n(\phi)$.

The search of the best combination phase $\phi$ thus entails the optimization of a function (herein designated as Funz) that in most of the cases will be equal to $BER_n(\phi)$ but that in some particular instances will be equal to $BER1_n(\phi)$ or to $BER2_n(\phi)$ (block diagram of FIG. 4).

In this FIG the following blocks are shown:

73: the overall function.

74: handles the variations of phase.

75: calculates values of $BER_n(\phi)$, $BER1_n(\phi)$, $BER2_n(\phi)$ after the phase variation.

76: assigns the present value of $BER_n(\phi)$ to $Funz(\phi)$.

77: evaluates if the absolute value of the difference between the actual value of $Funz(\phi)$ and the reference value Funzrifb is less than a predetermined small quantity Difb.

78: assigns the present value of $Funz(\phi)$ to the reference value Funzrifb.

79: evaluates whether the test of block 77 has been successful n1 consecutive times.

80: evaluates whether $Ban_n(\phi)$ has worsened in response to the n1 consecutive shifts of phase $\phi$.

81: assigns the present value of $BER1_n(\phi)$ to $Funz(\phi)$.

82: evaluates whether the absolute value of the difference between the present value of Funz($\phi$) and the reference value Funzrifr is less than any small quantity Difr.
83: assigns the present value of Funz($\phi$) to reference value Funzrifr.
84: evaluates whether the test of block 82 has been successful n2 consecutive times.
85: assigns the present value of BER2$_n$($\phi$) to Funz ($\phi$).
86: evaluates whether after the phase shift Funz ($\phi$) is worsened and, in the affirmative, it inverts the shifting direction of phase ($\phi$).

As noted previously, another difficulty arising during optimization of the BER$_n$($\phi$) function, is that as a general rule this function does not have only one minimum but has at least a relative minimum M$_{rel}$ and an absolute minimum M$_{ass}$ (FIG. 3A) and not all such minimums result in the same performance of the link. It is therefore desirable, once a minimum BER$_n$($\phi$) has been reached, to recognize if that minimum is only a relative minimum that does not optimize the performance of the radio link, and in that case to continue search for the absolute minimum.

Figure 5:
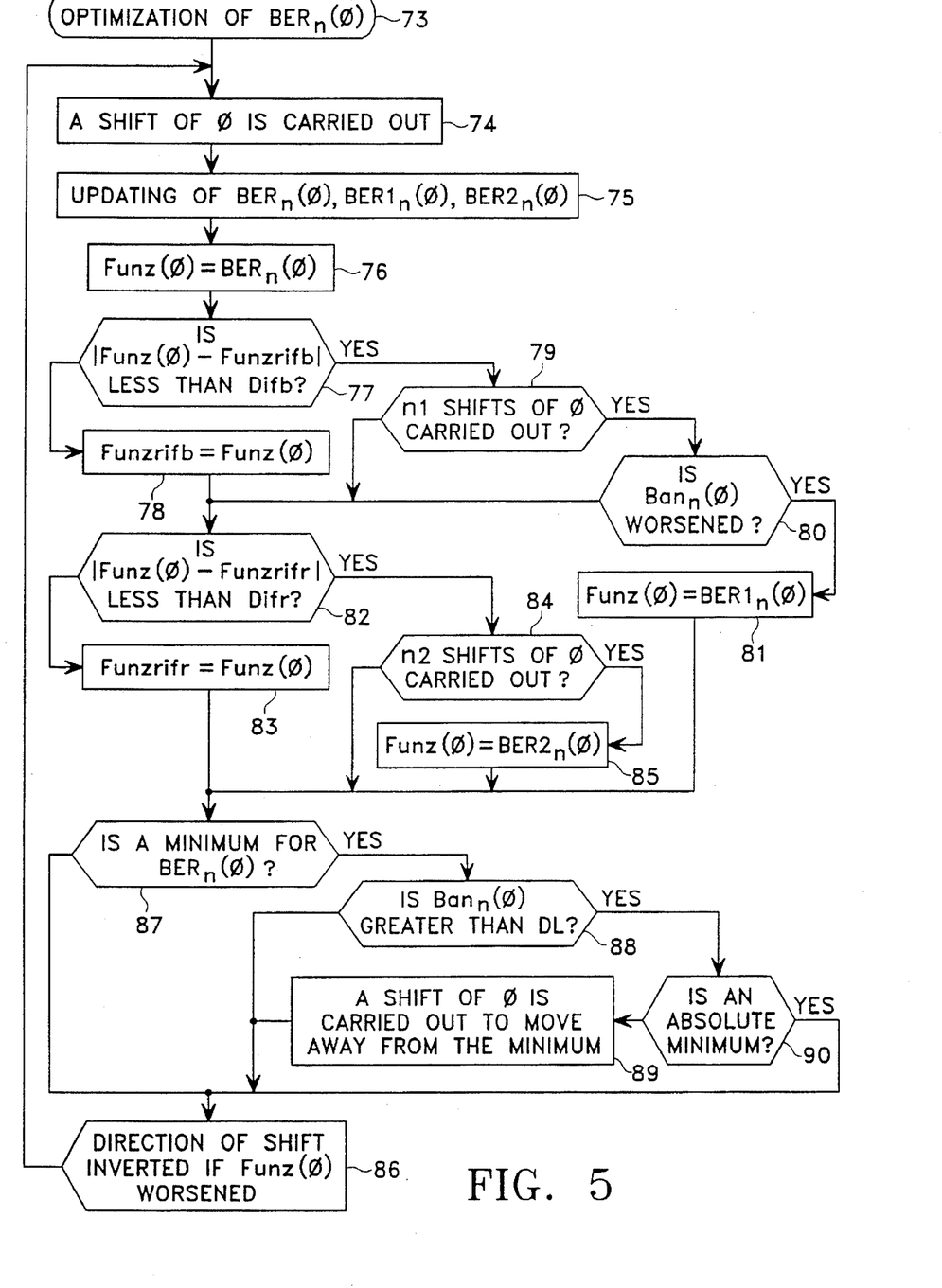
FIG. 5 is another block diagram showing how an absolute minimum is identified.

FIG. 5 shows a modified version of the block diagram of FIG. 4, in which the recombined data spectrum is to be subjected to additional tests in order to be able to determine whether or not an absolute minimum has been identified.

As can be seen in FIG. 5, blocks 73 to 86 of FIG. 4 are preferably supplemented by the following blocks:
87: evaluates whether the current phase $\phi$ minimizes BER$_n$ ($\phi$).
88: checks if the dispersion of the combined data spectrum is greater than value DL after BER$_n$($\phi$) has reached a minimum.
90: checks if the minimum is an absolute minimum. The function of block 90 is shown in more detail in FIG. 8.
89: carries out a phase shift sufficient to pass over a relative minimum.

Figure 6:
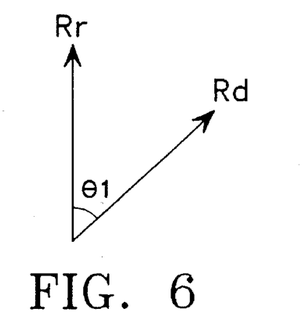
FIG. 6 is a simplified vectorial representation of a radio transmissive channel showing how a direct ray and a reflected ray may interact to provide selective fading.

By using the known vectorial representation of the radio transmissive channel affected by selective fading (reduced three-ray model), two vectors, one representing the direct ray Rd and the other representing the reflected ray Rr, are obtained (FIG. 6). The reflected ray Rr assumes different phase shifts $\Theta$i with respect to the direct ray Rd depending on the frequency position of the selective notch (Nse).

Figure 7A:
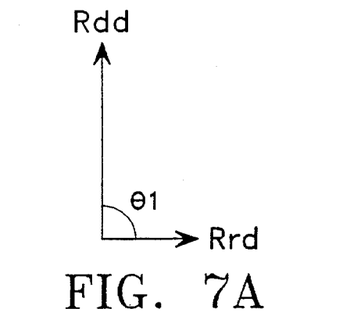
FIG. 7A shows the direct and reflected rays received on one channel.
Figure 7B:
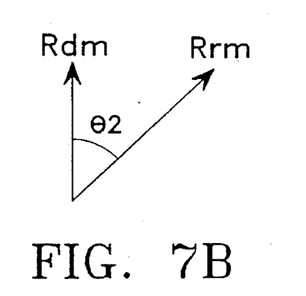
FIG. 7B shows the direct and reflected rays received on another channel.

Similarly, in a combiner of a spatial and/or angular diversity radio receiver, the two received signals can be characterized in terms of vectors: in FIGS. 7A and 7B there are illustrated the direct ray Rdd received on the DIV channel, the direct ray Rdm received on MAIN channel, and the respective reflected rays Rrd and Rrm.

The absolute value and phase shift of each of the reflected rays Rrd and Rrm of the two channels, relative to the corresponding direct ray, characterize the dispersion, due to the selective fading, associated with each of the two received signals.

Figure 7C:
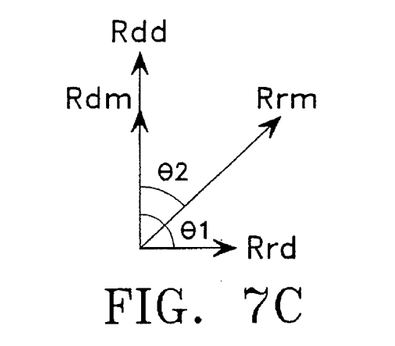
FIG. 7C shows a first recombination phase maximizing the power.
Figure 7D:
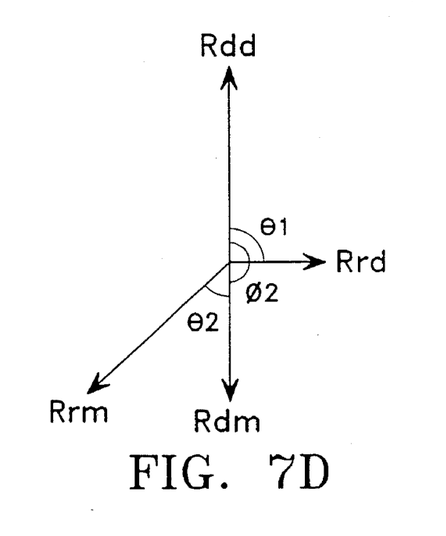
FIG. 7D shows a second recombination phase minimizing dispersion.
Figure 7E:
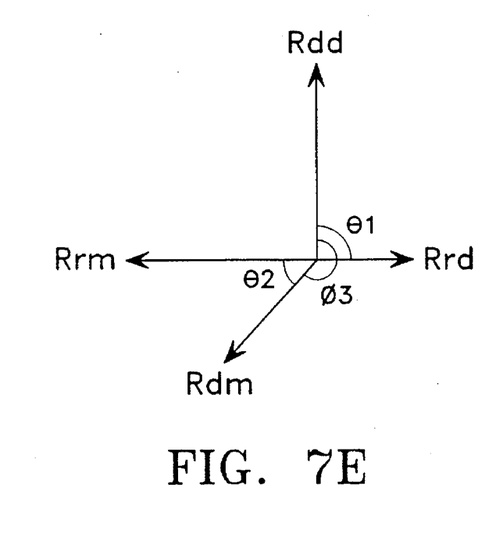
FIG. 7E shows a third recombination phase also minimizing dispersion.

Inspection of FIGS. 7C to 7E shows that there exist at least three possible recombination phases $\phi$1, $\phi$2, $\phi$3: one that maximizes the power (FIG. 7c, $\phi$1=0) and two that reduce the dispersion at the expense of a reduced recombined signal power (FIGS. 7d and 7e). The recombination phase obtained by optimizing BER$_n$($\phi$) will normally be an optimum phase that results in both low dispersion and high power.

However there are some BER$_n$($\phi$)'s for which the minima at minimum dispersion and at maximum power do not correspond to recombination phases providing comparable performance for the radio link. Some typical cases are those in which for both channels there is a selective fading with a notch coinciding with or close to the band-center frequency of the data spectrum in transmission and the minimum dispersion recombination points therefore practically coincide. For such BER$_n$($\phi$)'s it is necessary to identify a criterion which facilitates the following two operations:
1 Identifying a non-optimal relative minimum that results in degraded system performance or even an out of order condition.
2 Positioning on the absolute minimum that results in the optimization of the radio link.

A non-optimal relative minimum of BER$_n\phi$ that corresponds to the minimum dispersion can be identified by monitoring the power of the recombined data spectrum.

The case in which the non-optimal relative minimum of BER$_n$($\phi$) coincides with the maximum power is more difficult to evaluate.

In either case it is first necessary to establish if the current phase is one that minimizes BER$_n$($\phi$). Once a phase that minimizes BER$_n$($\phi$) has been reached, the phase will be locked to that minimum and will move only within a predetermined neighborhood of that phase. Therefore in order to determine that the current phase corresponds to a minimum value of BER$_n\phi$, it is sufficient to check whether a predetermined number (ns) of phase shifts in the neighborhood of the current phase value have already been carried out.

If the data spectrum dispersion (Ban$_n$) is greater than a predetermined value DL (88), the identified minimum is one that maximizes the power (FIG. 5). However, this does not necessarily mean that a better minimum exists, since for some BER$_n$($\phi$)'s the minimum that maximizes power is the absolute minimum. It is therefore necessary to also check for other conditions which permit a better minimum to exist for combination purposes. Such conditions occur when the depth Bc of the notches present on the two channels is considerably different, such as to allow an optimal recombination that favors a minimum dispersion.

The following procedure may be used to determine the existence of the above-described conditions (FIG. 8):
1 Attenuators T1 and T2 are unbalanced in one direction, T1 with an attenuation value that exceeds by a certain amount "delta" the attenuation nominal value (T1$_a$=T1$_n$+delta) and T2 with a lower value (T2$_a$=T2$_n$–delta (92); then they are unbalanced in the opposite direction in which T1 has a value lower than the attenuation nominal value by a certain amount "delta" and T2 has a respective higher value (94). Following each such unbalance of the attenuators, the analog BER (93, 95) is checked for a corresponding improvement indicating that the depth B$_c$ of the two notches is considerably different, and that a better recombination favoring a minimum dispersion is therefore possible.

Thus, if such an improvement is detected, the minimum is a relative minimum (97), otherwise the minimum is absolute (96) for BER$_n$($\phi$).

Figure 8:
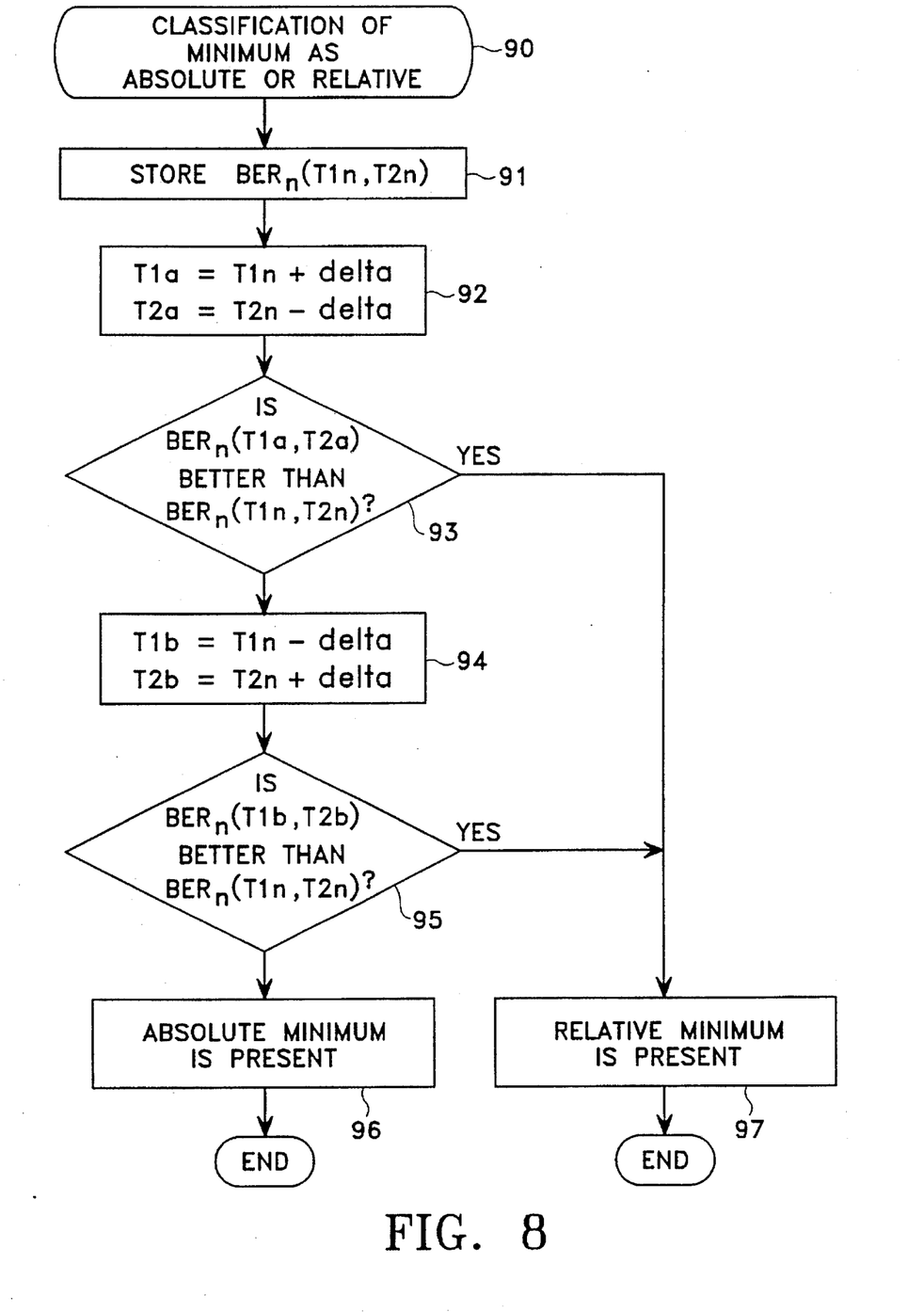
FIG. 8 is a block diagram for checking whether a relative minimum is an absolute minimum.

In FIG. 8 the following blocks are shown:
90 the overall function.
91 stores the value of the minimum of BER$_n$($\phi$,T1,T2) obtained by optimizing the phase with attenuators T1, T2 equal to respective nominal values T1$_n$, T2$_n$.
92 unbalances in one direction the attenuation level of the two channels; the attenuation values after such unbalance will be T1$_a$=T1$_n$+delta and T2$_a$=T2$_n$–delta.
93 compares the value of BER$_n$(T1$_n$,T2$_n$) stored in block 91 with the value of BER$_n$(T1$_a$, T2$_a$) obtained by carrying out the unbalance of block 92 to check if an improvement of BER$_n$(T1,T2) has occurred.
94 unbalances the attenuation level of the two channels in a direction opposite to the one of block 92; the attenuation values after such unbalance will be $T1_b = T1_n - \text{delta}$ and $T2_b = T2_n + \text{delta}$ 95 compares the values of $BER_n(T1_n, T2_n)$ stored in block 91 with the value of $BER_n(T1_b, T2_b)$ obtained by carrying out the unbalance of block 94 in order to check if an improvement of $BER_n(T1,T2)$ has occurred.

96 at this block one arrives only if both tests of blocks 93 and 95 have not been successful and therefore it can be asserted that the current minimum for $BER_n(\phi)$ is an absolute minimum.

97 at this block one arrives only if at least one of the tests of blocks 93,95 has been successful and hence it can be asserted that the current minimum for $BER_n(\phi)$ is a relative minimum.

In both the examined cases, once it has been determined that the current minimum is a non-optimal relative minimum of $BER_n(\phi)$, the phase is merely shifted (89) by a sufficient amount to ensure that it will converge to another minimum, and thus that it will eventually converge to the absolute minimum of $BER_n(\phi)$ (FIG. 5).

A particular example of the above-described method of distinguishing the relative minima of $BER_n(\phi)$ in which the power is maximized utilizes a type of "signature" measurement (FIG. 9) which typically is performed on a conventional radio system not provided with spatial and/or angular diversity reception in order to evaluate its susceptibility to selective fading. The signature measurement is performed on the receiver of the present invention using the following protocol:

1 One of the channels is assumed to be subject to a selective fading at the frequency of the radio carrier having a notch depth sufficient to result in a high error rate, e.g. 10 E-6, 10 E-5, . . . , if the system were not provided with a diversity reception channel to mitigate the effects of such selective fading.
2 The selective fading parameters are varied on the other channel both as to frequency position and as to notch depth $B_c$ while monitoring the response of the combined system.
3 The two fading channels are kept in phase with one another. The result is represented in FIG. 9.

Figure 9:
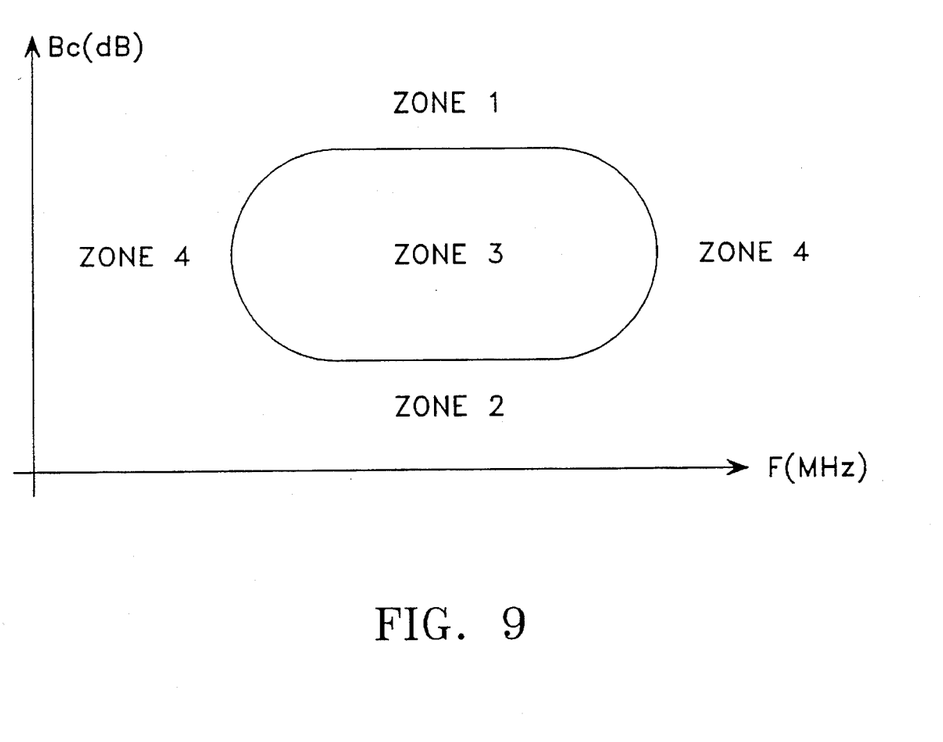
FIG. 9 shows the use of a signature measurement to evaluate whether the channels have been combined in an optimum manner.

In zone 1 of FIG. 9, a minimum of $BER_n(\phi)$ that maximizes the power is an absolute minimum, while in zone 2 such minimum is a relative minimum that is not optimal for radio linkage purposes.

Zone 3, which may represent an out of order area of the system, is a zone where there is no minimum of $BER_n(\phi)$ more optimal than the one which maximizes the power, since the depth $B_c$ of the notches present on the two channels is not sufficiently different.

Zone 4 is a zone in which minimizing the $BER_n(\phi)$ through a conventional gradient method does not present any problem.

The above-described problems in optimizing $\phi$ arise for some $BER_n(\phi)$'s while for others they do not exist, but it should be noted that the solution of such problems is very important to ensure the correct operation of the combiner under conditions that may be encountered in a practical application, i.e. with the parameters of selective fading present on the MAIN and DIV channels varying dynamically and resulting in a rapid succession of different $BER_n(\phi)$'s that must each be optimized in real time.

In accordance with the present invention, the analog BER function is optimized not only by varying the phase between the MAIN channel and the DIV channel, but also by varying the attenuation value introduced on the two channels of attenuators T1 and T2.

Varying the attenuation value of T1 and T2 is advantageous for many reasons; in particular, the two signals even in the absence of any selective fading can reach the combiner with different power levels.

This can occur because of different propagation features characteristic of the two channels, or because of a temporary mispointing of the antennas (in a spatial diversity system).

In such circumstances if the level difference between the two channels is not equalized by means of attenuators T1 and T2, the tolerance of the combiner to selective fading will degrade as a function of the level difference.

Moreover, it may happen that also when levels of the two signals due to flat fading are equal, there are selective fading conditions of the two channels for which, besides optimizing the analog BER function by varying the phase, it is advantageous to vary the attenuation value of T1 and T2 to the end of combination.

Figure 10:
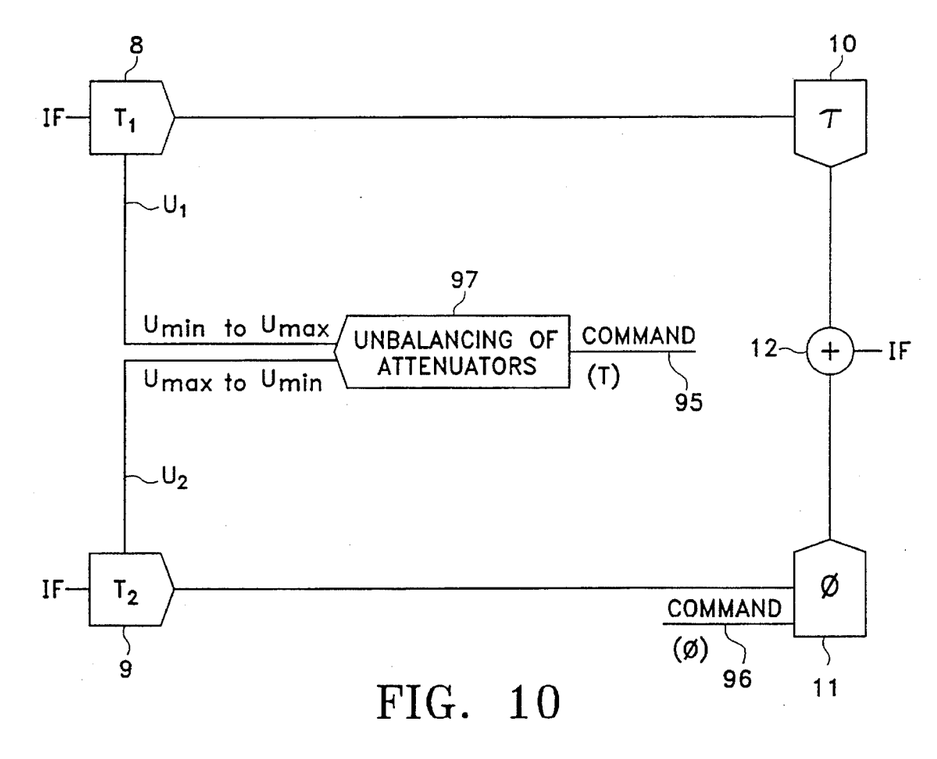
FIG. 10 shows a modification to FIG. 1 wherein a single control voltage controls both attenuators.

The variables are therefore three, but if the two attenuation commands are combined so that if one of the two attenuators increases the attenuation with respect to a nominal value, the other decreases it and vice versa, there is defined a variable (T) which measures the unbalance between the two attenuators (FIG 10).

The resultant two variables, corresponding to an attenuation unbalance command (95) and a phase shifter command (96), are therefore the variables to be acted upon to optimize the analog BER function for which the following symbol is adopted: $BER_n(\phi,T)$. As shown in FIG. 10, T is the value of the attenuator unbalance command (95) to a control circuit (97) which outputs first and second control voltages U1 and U2 between a minimum value $U_{min}$ and a maximum value $U_{max}$ in a complementary manner such that when one control voltage is at said minimum value, the other control voltage is at said maximum value, and vice versa.

Surprisingly, it has been found by Applicants that it is better first to optimize the $BER_n(\phi,T)$ function by varying the phase and then to unbalance the attenuators with the phase held at the previously obtain optimum value. Accordingly, in a preferred embodiment, the $BER_n(\phi,T)$ function is first optimized as described above and the attenuators are then unbalanced for optimum performance, using the exemplary method represented by the block diagram in FIG. 11.

Figure 11:
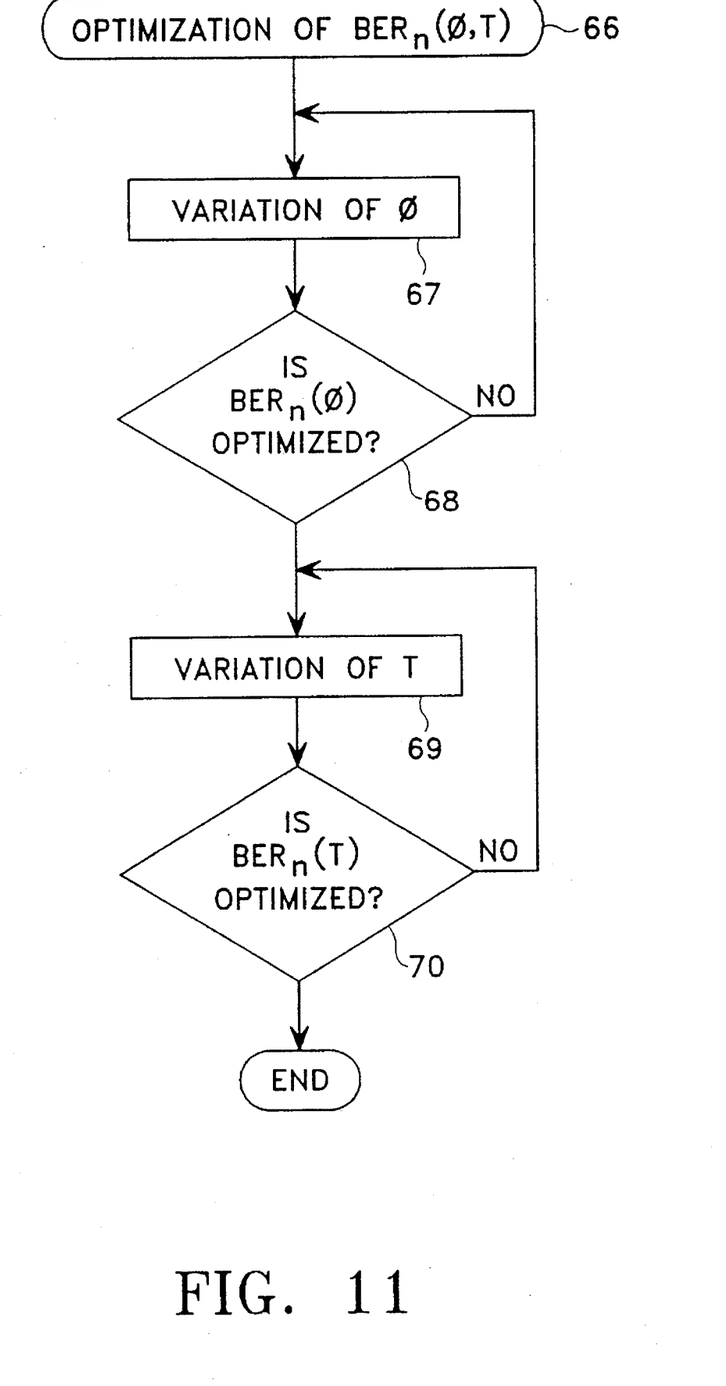
FIG. 11 is a block diagram for a generalized method for varying both the phase and the attenuation in order to optimize the analog BER.

In FIG. 11 the following blocks are represented:
66: the overall function.
67: handles the variation of the phase.
68: evaluates the effects of the phase variation, both ways, for the purpose of $BER_n$ optimization.
69: handles the variations of the attenuator unbalance T.
70: evaluates the effects of the variation of the attenuators unbalance T for the purpose of the optimization of $BER_n(\phi)$.

At this point it is evident that the phase optimization of $BER_n(\phi, T)$ is predominant with respect to the subsequent optimization carried out by moving the attenuators.

By moving the attenuators it is possible to improve some situations for which the phase optimized $BER_n(\phi)$ has been already found; in fact, by executing shifts of the attenuators one can reduce the dispersion of the recombined data-spectrum without the risk of drastically lowering the power, an eventuality always present when one tries to minimize dispersion through phase shifting.

Figure 12:
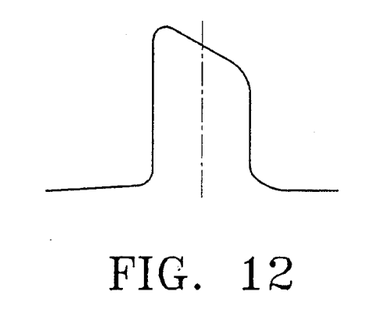
FIG. 12 shows a recombined data spectrum presenting a linear dispersion.

One typical circumstance in which it is advantageous to vary the attenuator command is the one of FIG. 12 where a recombined data spectrum which presents a linear dispersion is shown. As noted previously, if the flat attenuation level of the two signals is different, optimizing the phase analog BER does not necessarily result in a better data spectrum; in this case it is sufficient to equalize such a level difference by varying the value of T to obtain a data spectrum with practically zero dispersion without the occurrence of significant power variations in the recombined spectrum.

Moreover there are some circumstances in which the flat attenuation level of the two signals is equal, and yet the recombined signal data spectrum is still similar to the one of FIG. 12 after having reached the optimum phase for $BER_n(\phi)$. In these circumstances varying the attenuation level (T1, T2) while trying to minimize dispersion also results in a recombined data spectrum with practically zero dispersion without significant power variations.

Although in most cases it will be immaterial whether the dispersion $Ban_n(T)$ or the analog $BER_n(T)$ is the function being optimized as the attention unbalance command (T) is varied, optimizing dispersion is preferred since the risk under certain conditions of completely turning off one of the channels is reduced. This would not be desirable because when the conditions change, turning on the channel by resetting its attenuation to its nominal value requires more complexity and hence higher costs.

Figure 13:
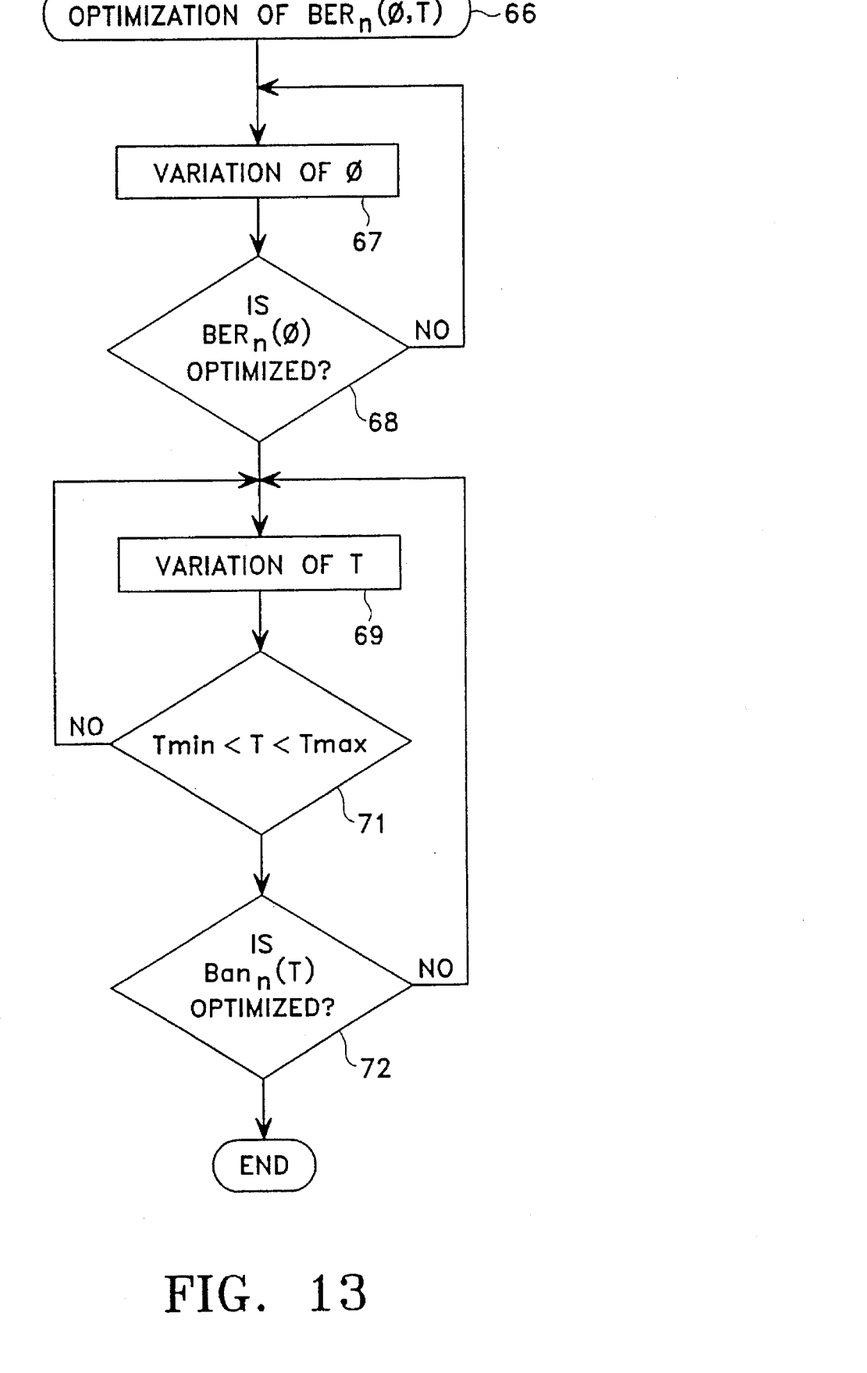
FIG. 13 is a block diagram of a preferred implementation of the generalized method of FIG. 11.

Therefore it is advantageous to optimize the dispersion $Ban_n(T)$ when moving the attenuators unbalance command, and moreover it is of advantage to restrict unbalance within certain values which will be designated by Tmin and Tmax (block diagram of FIG. 13, which is a preferred implementation of the generalized block diagram of FIG. 11).

The following blocks are shown in FIG. 13:
66: the overall function.
67: handles variations of phase.
68: evaluates the effects of variation, both ways, of the phase for the purpose of BER β (φ) optimization.
69: handles the variations of the attenuators unbalance command T.
71: limits the range of the attenuators unbalance command T between a maximum value Tmax and a minimum one Tmin.
72: evaluates the effects of variation of attenuators unbalance command T for the purpose of $Ban_n(T)$ optimization.

A preferred embodiment of a system for implementing the above methods will now be described, with reference to FIG. 14.

Figure 14:
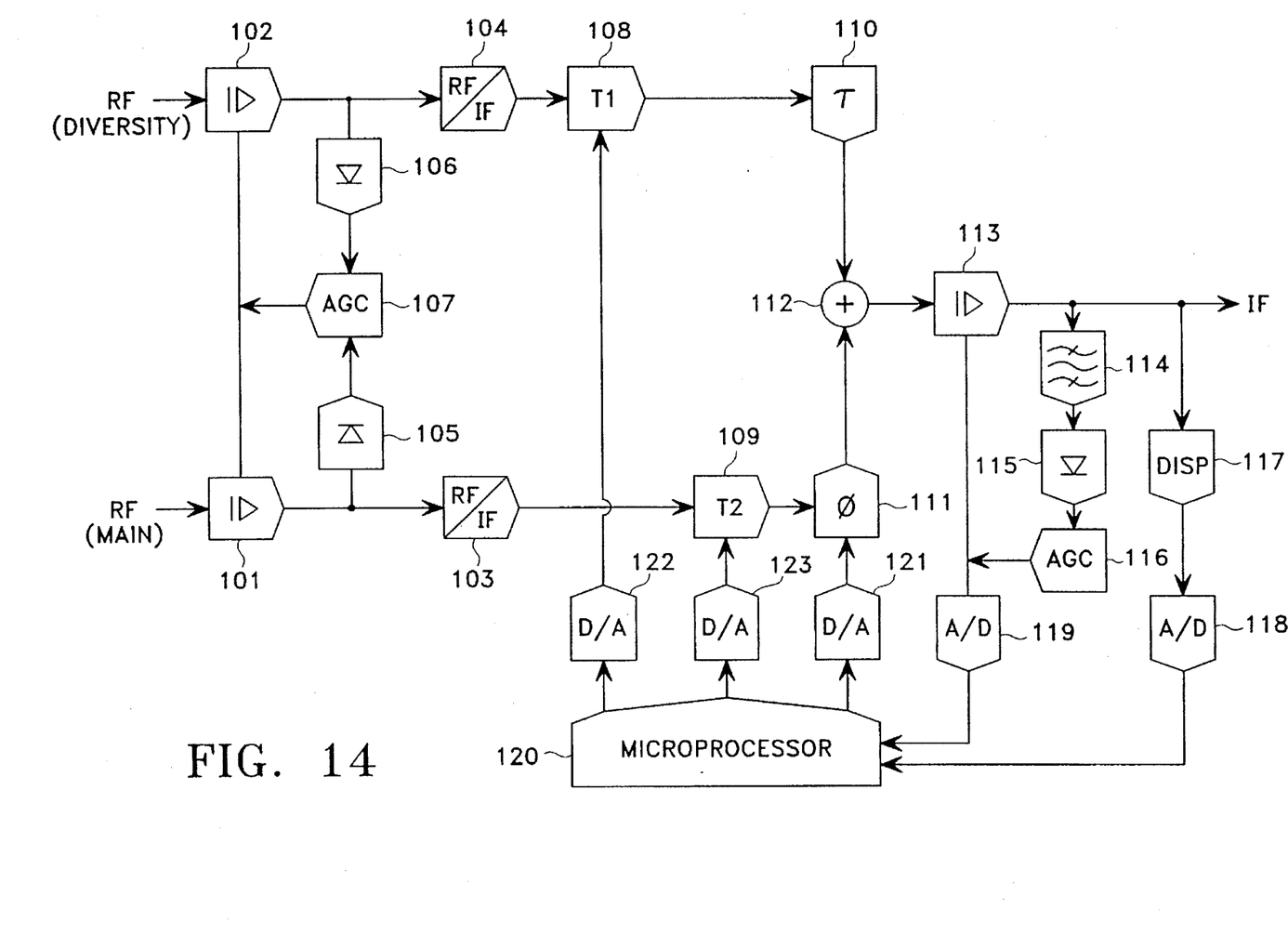
FIG. 14 is a generalized schematic of a preferred embodiment of a system for implementing the above methods.

In FIG. 14, the various blocks respectively indicate:
101, 102: RF amplifier
103, 104: Mixer
105, 106, 115: Detector
107: Automatic Gain Controller
108: Driven Attenuator T1
109: Driven Attenuator T2
110: Delay Line
111: Driven Phase Shifter
112: Summing node
113: IF Amplifier
114: Power Detection Filter
116: Automatic Gain Control
117: Dispersion Measuring Network
118, 119: A/D Converter
120: Microprocessor
121, 122, 123: D/A Converter It will be noted that the system of FIG. 14 includes an automatic gain controller (107) for the two channels upstream of the mixers (104 and 103), which controls the two variable gain devices 101, 102 (one on the MAIN channel and the other on the DIV channel), placed in the two RF sections upstream of the mixers (103, 104), through a single control voltage (FIG. 14). The AGC voltage (107) driving the two devices (101 and 102) is determined by the detecting device (106, 105) which receives the higher power level. As a result, if on the MAIN channel there is an incoming signal with a lower power than that on the DIV channel, the AGC voltage which drives both 101 and 102 originates from the detecting device (106) which measures the power of DIV. This solution prevents signals from reaching the mixers with a power greater than the input nominal level for such devices which is one of the reasons for which upstream of the mixer a variable gain device is required; moreover, devices 101 and 102 will have always the same gain thus avoiding the creation of problems during the combination step.

In the interest of clarity, the invention has been described with reference to certain specific and preferred embodiments; countless modifications, substitutions and the like will doubtless be apparent to those skilled in the art without departing from the scope and the spirit of the invention.

We claim:

1. Method of combining two channels of a diversity digital radio receiver to form a recombined channel having an optimized data spectrum, comprising the steps:

setting an attenuation of each channel to a nominal balanced value, varying a relative phase between the two channels, combining respective outputs from the two channels to form the recombined channel, measuring the power and dispersion of the recombined channel, using an analog bit error rate function responsive to the measured power and dispersion of the recombined channel to identify an optimal value for the relative phase holding fixed the optimal value so identified, and then varying a relative attenuation level between the two channels until an optimal value of the relative attenuation level is been found corresponding to said optimal value for the relative phase, wherein: the relative attenuation level is varied between first and second predetermined values, and a function dependent only on the measured dispersion of the recombined channel is used to locate the optimum relative attenuation level.

2. Method according to claim 1 wherein the analog bit error rate function is also used to locate the optimal relative attenuation level.

\* \* \* \* \*

UNITED STATES PATENT AND TRADEMARK OFFICE
CERTIFICATE OF CORRECTION

PATENT NO. : 5,481,569
DATED : January 2, 1996
INVENTOR(S) : Conti, et al.

It is certified that error appears in the above-identified patent and that said Letters Patent is hereby corrected as shown below:

On the title page, item [54],
In the title, "BIT" should be --BER--

In Col. 1, line 1, "BIT" should be --BER--

In Col. 1, line 24, "bit err rate" should be --bit error rate--

In Col. 2, line 55, "minimize" should be --minimal--

In Col. 3, line 35, start new paragraph with --FIG. 7B--

In Col. 5, lines 8 and 9, delete space after "FUNZ" and before "($\phi$)"

In Col. 6, lines 10 and 21, "$BER_n\phi$" should be --$BER_n(\phi)$--

In Col. 6, line 33, "Bc" should be --$B_C$--

In Col. 8, line 38, "obtain" should be --obtained--

In Col. 10, line 43, insert a comma after "phase".

Signed and Sealed this

Thirteenth Day of August, 1996

Attest:

BRUCE LEHMAN

Attesting Officer

Commissioner of Patents and Trademarks